US007283135B1

(12) United States Patent
Coté et al.

(10) Patent No.: US 7,283,135 B1
(45) Date of Patent: Oct. 16, 2007

(54) HIERARCHICAL TILE-BASED DATA STRUCTURE FOR EFFICIENT CLIENT-SERVER PUBLISHING OF DATA OVER NETWORK CONNECTIONS

(75) Inventors: Stéphane Coté, Lac Beauport (CA); Alain Lapierre, Québec (CA); Martin Roy, Québec (CA)

(73) Assignee: Bentley Systems, Inc., Exton, PA (US)

( * ) Notice: Subject to any disclaimer, the term of this patent is extended or adjusted under 35 U.S.C. 154(b) by 862 days.

(21) Appl. No.: 10/164,319

(22) Filed: Jun. 6, 2002

(51) Int. Cl.
*G06T 17/00* (2006.01)
(52) U.S. Cl. ..................................... 345/428; 345/419
(58) Field of Classification Search ................ 345/428, 345/423, 557; 706/919, 921
See application file for complete search history.

(56) References Cited

U.S. PATENT DOCUMENTS

| 5,953,506 | A  | * | 9/1999  | Kalra et al.    | 709/231 |
|-----------|----|---|---------|-----------------|---------|
| 6,002,406 | A  | * | 12/1999 | Zhao            | 345/581 |
| 6,219,045 | B1 | * | 4/2001  | Leahy et al.    | 715/757 |
| 6,278,432 | B1 | * | 8/2001  | Ratnakar        | 715/748 |
| 6,348,921 | B1 | * | 2/2002  | Zhao et al.     | 345/428 |
| 6,618,053 | B1 | * | 9/2003  | Tanner          | 345/552 |
| 6,633,688 | B1 | * | 10/2003 | Nixon et al.    | 382/305 |
| 2002/0103970 | A1 | * | 8/2002 | Gut et al.     | 711/118 |
| 2003/0151602 | A1 | * | 8/2003 | Sadowsky et al. | 345/419 |
| 2003/0221017 | A1 | * | 11/2003 | Kim            | 709/247 |

FOREIGN PATENT DOCUMENTS

EP   933694 A1 *  8/1999

OTHER PUBLICATIONS

"Using Oracle's Spatial Capabilities" — website address: www.cast.uark.edu/local/uaclasses/advgis/oracle/spatial; date: Feb. 12, 2002.
"Geo VRML.org" —website address: www.si.sri.com/geovrml; date: Feb. 12, 2002.
"RealityWave", Overview section—website address: www.realitywave.com/technology-overview.asp; date : Feb. 12, 2002.
"Idevio, Innovative Vector Storage", RAVE Geo section—website address: www.idevio.com/ravegeoinfo.htm date: Feb. 12, 2002.
"Viecon Publisher-Technical Profile", Bentley Systems, Inc.; 2001.
"E-Image 1.1 Functional Specifications", Alain Robert, May 31, 1999.

* cited by examiner

*Primary Examiner*—Ulka Chauhan
*Assistant Examiner*—Said Broome
(74) *Attorney, Agent, or Firm*—Vanable LLP; Jeffri A. Kaminski; Caroline J. Swindell

(57) ABSTRACT

In a system of a client and a server, the server stores three dimensional CAD data in a cache. The CAD data is stored in the cache in levels of detail further divided into tiles. When a client receives a request from a user to view part of a CAD file, the client determines which portion of the CAD file is being viewed, and at what resolution. The client then checks a client cache for tiles already stored for the desired view. The client requests the view data from the server by providing to the server the client's resolution, the boundary of the viewing area and a list of tiles that the client already has. The server uses the request information to return to the client only the data that is needed for the client's resolution and that is not already stored on the client.

36 Claims, 11 Drawing Sheets

HIERARCHICAL TILE-BASED DATA STRUCTURE FOR EFFICIENT CLIENT-SERVER PUBLISHING OF DATA OVER NETWORK CONNECTIONS

BACKGROUND OF THE INVENTION

1. Field of the Invention

The present invention relates generally to publishing files for viewing over a network and more particularly to transferring graphics information in computer assisted design (CAD) elements efficiently over a network.

2. Related Art

Graphic design computer programs, including CAD applications, generate large electronic files that can contain a great deal of data and detail about the graphic file and its individual components. For example, an architectural graphic file might display the floor plan of a building, showing walls, floors, windows, etc., as well as plumbing and electrical lines. The CAD file itself might contain further detail about what kind of plumbing materials are to be used or whether the plan for the area displayed has been approved. CAD data are often stored in elements, where each element in the file represents a component, a group of components or a portion of a component contained in the drawing. For example, in a pipe design file, an element can represent a pipe, or a small part of a complex pump. The shape of the element can represent the shape of the component, or a symbolic representation of it.

Some CAD systems store the main design files on a server computer, and designers and builders may access the design files remotely from a client computer. In these prior art CAD viewing systems, the entire design file is typically transferred from the server to the client. Transfer of the entire design file leads to various inefficiencies. For example, the files can be quite large. These large files require extra time and expense to transfer. Further, a file typically contains more information than a user can view at one time. For example, a user may only require a view of one room of an entire office building floor plan. However, all of the unviewed and unneeded information is nevertheless transmitted to the client computer, slowing the user's access to the information.

There have been several approaches to sharing non-CAD image data over a network which attempt to overcome these problems. One approach, such at the one used by ModelServer Imager (MSI) of HMR, Inc., separates the image data into tiles, and only sends the tiles that are needed to the client. MSI serves raster data, however, not CAD data, and the tiles are only two dimensional. Additionally, the data in each overview is repeated in MSI, so that when a user makes a small shift in viewing area, the entire overview must be re-sent, even though part of the overview is used again. This makes the data sharing less efficient.

Another approach, used by Oracle Spatial, is to use a quadtree data structure to segment the spatial coverage of vector elements. A quadtree is only two dimensional, and, in Oracle Spatial, only supports one level of detail (LOD).

GeoVRML, an improvement on virtual reality meta language (VRML) designed for representing geographical data also uses tiles, as well as levels of detail (LOD). However, the data in each LOD is repeated at different resolutions, which results in a duplication of data.

VizStream of RealityWave, Inc. shares large three dimensional models over a network by streaming the data from the server to the client, allowing the client to start displaying the file before the entire file is received. The CAD files, however, must be converted into a special format for streaming, a process which can be time-consuming. In addition to the format transformation, the data itself is tessellated into triangular meshes, which causes loss of the original elements and some of the quality of the representation, and which dramatically increases file size.

Viecon Publisher (VP) of Bentley Systems, Inc. publishes CAD and raster data. However, the CAD elements are plotted and stroked, that is, each element in the CAD file is transformed into lines. Complex elements, such as circles, are transformed into sets of short lines that simulate their shape. The consequences of these transformations are that elements lose their analytical nature and the amount of data sent to the client increases dramatically for small complex elements such as text. VP uses views rather than tiles. If two overlapping views are needed, overlapping data is sent twice, once for each view. VP also sends all of the CAD elements in the view, regardless of the size of those elements, even those that are too small to be visible. This makes the size of the data sent to the client unnecessarily large.

Accordingly, there is a need for a system and a method of sharing graphical data, including vector data, over a network that is efficient in both time and network resources.

SUMMARY OF THE INVENTION

In an exemplary embodiment of the present invention a hierarchical tile-based data structure for efficient client-server publishing of CAD data over network connections is disclosed.

In an exemplary embodiment, the present invention can comprise a method in a computer system for publishing CAD data over a network. The method can have the steps of dividing CAD data from a CAD data file on a server into a plurality of levels of detail (LODs); associating each CAD element in the CAD data to a LOD that corresponds to the element's size; dividing the LODs into a plurality of tiles; associating each CAD element in the LOD to the smallest tiles that encloses the element; and storing the tiles and LODs in a server cache, which is coupled to the server. The method can have the further steps of receiving a request for data in a viewing area from a client; populating the server cache when the server does not contain the requested data; determining whether the data in the server cache is valid based on whether it was created from the current state of the CAD file; when the data in the server cache is valid, selecting a first set of tiles from the data in the server cache, where the first set of tiles is viewable at the client's resolution; selecting a second set of tiles from the first set of tiles, where the second set of tiles is enclosed by the viewing area; prioritizing the second set of tiles; and publishing the second set of tiles to the client.

In another exemplary embodiment, the present invention can be a method in a computer system for publishing CAD data over a network comprising the steps of receiving, on a client, a user request for a view of a part of a CAD data file; transmitting a data request to a server, where the request has a client view resolution, a list of tiles not required for the view of part of the CAD file, and a boundary of the requested view; and receiving the requested data from the server, where the received data contains at least one tile in a level of detail. The list of tiles not required can be created by determining which tiles comprising the user request for a view are stored in a local cache on the client; identifying a set of tiles at the deepest hierarchy level in the local cache; and listing the set of tiles at the deepest hierarchy level in the list of tiles not required.

In yet another embodiment, the present invention can be a system for publishing CAD data over a network having a server; a client coupled to the server via a network; a server cache coupled to and accessible by the server, operative to store at least one level of detail (LOD) and at least one tile within the LOD; a client cache coupled to and accessible by the client, operative to store at least one LOD and at least one tile within the LOD; a file divider on the server, operative to divide a CAD data file into a plurality of LODs; a LOD associator on the server, operative to associate each CAD element in the CAD data file with only one LOD; a LOD divider on the server, operative to divide each LOD into a plurality of tiles; and a tile associator on the server, operative to associate each CAD element in the LOD with only one tile. The system can further have a client request receiver, operative to receive a request for data from the client; a cache validator, operative to determine if the data in the server cache is valid with respect to the current state of the CAD file; a data selector, operative to select data from the server cache, where the selected data comprises only the requested data not already stored on the client; and a prioritizer, operative to prioritize the selected data. The system can further have a user request receiver on the client, operative to receive a user request on the client to view a part of a CAD data file; a needed data identifier on the client, operative to identify only the data needed by the client to display the requested view; a server data requestor on the client, operative to request the needed data from the server; and a server data receiver on the client, operative to receive the requested data from the server, wherein the requested data comprises at least one tile and one level of detail.

Further features and advantages of the invention, as well as the structure and operation of various embodiments of the invention, are described in detail below with reference to the accompanying drawings.

Definitions

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network. A computer can also be a personal digital assistant (PDA) or a cellular telephone having a means to viewing a CAD file.

A "computer-readable medium" refers to any storage device used for storing data accessible by a computer. Examples of a computer-readable medium include: a magnetic hard disk; a floppy disk; an optical disk, such as a CD-ROM, a CD-RW, and a DVD; a magnetic tape; or a memory chip.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are coupled by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an internet and an intranet.

A "vector" refers to a representation of graphical data, including CAD data, where the elements in a graphical image are represented as lines and/or shapes, as opposed to raster data where an image is represented as a collection of points or pixels.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF AN EXEMPLARY EMBODIMENT OF THE PRESENT INVENTION

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

The system and methods disclosed below address the problems of the related art in efficiently publishing graphical data over a network. The graphical data is compartmentalized by a server into multiple levels of detail, each representing discrete resolutions of the graphical data. Each level of detail is subsequently compartmentalized into tiles. Each tile represents either all or a portion of the entire viewable area of a graphics file. Each tile contains graphical elements that are both viewable at the resolution of the tile's level of detail and entirely contained within the tile's boundaries. The levels of detail (LOD) and the tiles are stored in a cache, accessible by the server. The assignment of an element in the graphics file to a specific LOD and tile is discrete. An element only appears in one LOD and one tile. This discrete assignment prevents the duplication of data seen in some of the prior attempts discussed above.

When a user views all or a portion of the graphics file, the client computer requests all data needed to present the view of the graphics file to the user. The client can maintain a local cache and store levels of detail and tiles within the cache for data already received from the server. When presenting a view of the graphics file to the user, the client needs only request the data not already contained in its local cache. By only requesting the data needed to complete a particular view of the graphics file, the system can drastically reduce the amount of data that needs to be transferred from the server to the client, conserving network resources.

Figure 1:
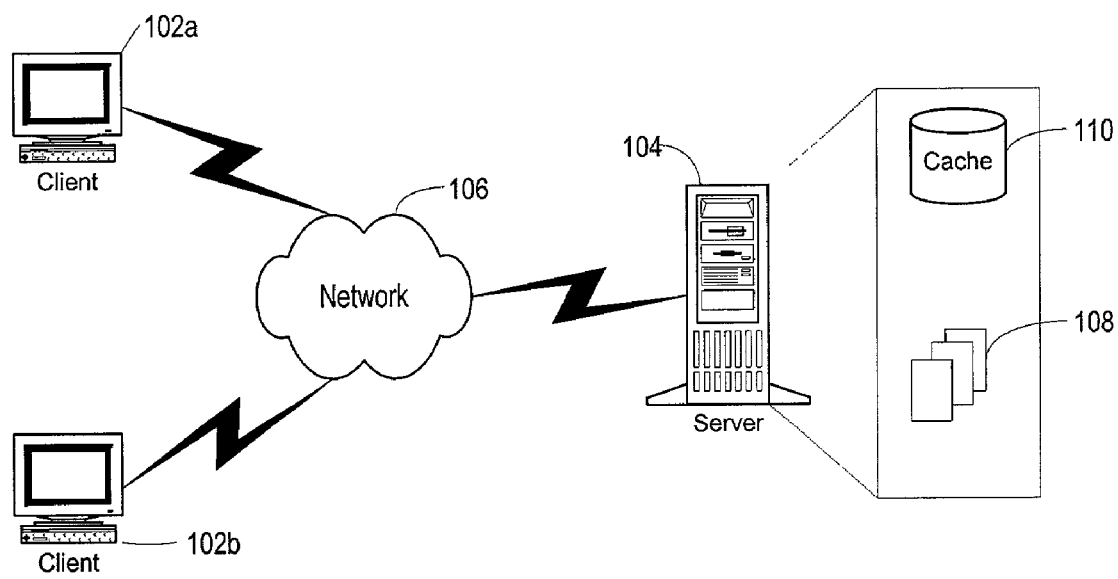
FIG. 1 depicts an exemplary embodiment of a system of the present invention.

FIG. 1 depicts an exemplary embodiment of a system of the present invention. The system can contain one or more client computers 102a and 102b (collectively, 102), coupled to a server 104 via a network 106. The server 104 stores data, such as CAD files 108 and publishes the CAD elements to the client computers 102 upon request, by converting the CAD elements into their geometric primitives. A CAD element is a discrete component of the image represented by the CAD file. The CAD files 108 can store the CAD elements. The client computers 102 can be used, for example, by project designers, to view and to edit the CAD files 108.

Another component of the system according to this embodiment of the present invention is a cache 110, coupled to and served from the server 104. The cache 110 may be stored on the server 104 itself. In an alternate embodiment, the cache 110 may be stored on another computer and be accessible to the server 104 through a network. The client 102 can hold a complete or partial copy of the cache locally.

The cache 110 stores CAD files by dividing the elements contained in the files among tiles and levels of detail (LODs). A tile represents a sub-section of the area or volume of the graphical image represented by the CAD file. A level of detail contains elements at a specific resolution range. For example, one resolution range could show an entire floor plan for an office building, and a more detailed resolution range could show a plumbing intersection in one wall of one floor of the office building. The combination of LOD and tiles allows the CAD data to be compartmentalized to the point where only the data needed for a particular view is transferred to the client. The size of the cache can be limited to a specific size, rather than needing to be large enough to accommodate all of the CAD data for a user's project, because the cache content can be reconstructed at any time for the CAD files.

Figure 2:
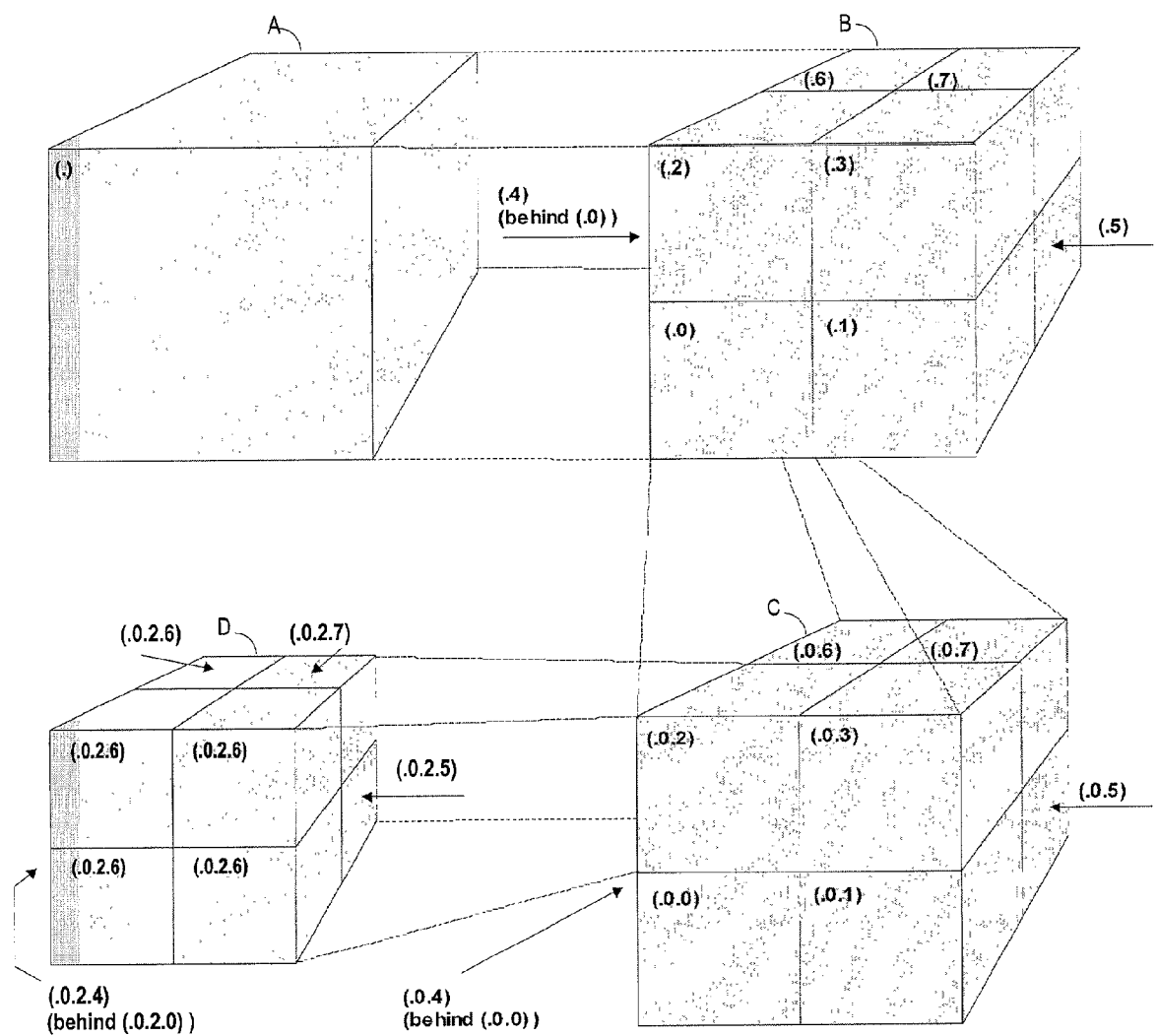
FIG. 2 depicts an exemplary embodiment of a CAD file divided into three-dimensional tiles according to the present invention.

FIG. 2 depicts an exemplary embodiment of a CAD file divided into tiles according to an embodiment of the present invention. The tiles are arranged in a hierarchical octree structure. An octree is a tree data structure where each tree node contains eight sections, each of which can point to a child node having eight sections. A file can be represented by several such octrees, each octree representing an individual level of detail (LOD). In each LOD, tiles are therefore divided in 8 sub-tiles, each tile represented by a node of the octree.

The numbering system in this example labels each tile with one number from 0 to 7 for each level in the tile hierarchy. The highest level tile is labeled (.). The left-most lower front sub-tile within tile (.) is labeled (.0). In FIG. 2, a main tile A (.) contains eight sub-tiles B (.0), (.1), (.2), (.3), (.4), (.5), (.6) and (.7). Sub-tile (.4) is located behind sub-tile (.0) and below sub-tile (.6). Each sub-tile further contains eight sub-tiles C. For example, sub-tile (.0) from B contains sub-tiles (.0.0), (.0.1), (.0.2), (.0.3), (.0.4), (.0.5), (.0.6) and (.0.7). Sub-tile (.0.2) from C further contains sub-tiles (.0.2.0), (.0.2.1), (.0.2.2), (.0.2.3), (.0.2.4), (.0.2.5), (.0.2.6), and (.0.2.7) in D. The hierarchy can contain as many levels as necessary to hold all of the CAD elements, as explained further below.

The preferred embodiment of the present invention uses octrees to store three dimensional (3D) CAD files, and in particular, to store 3D elements. However, to simplify the discussion, FIGS. 3-8 depict two dimensional (2D) quadtree structures that store two-dimensional CAD files. The discussion of the 2D quadtrees is analogous to a discussion of 3D octrees.

Figure 3:
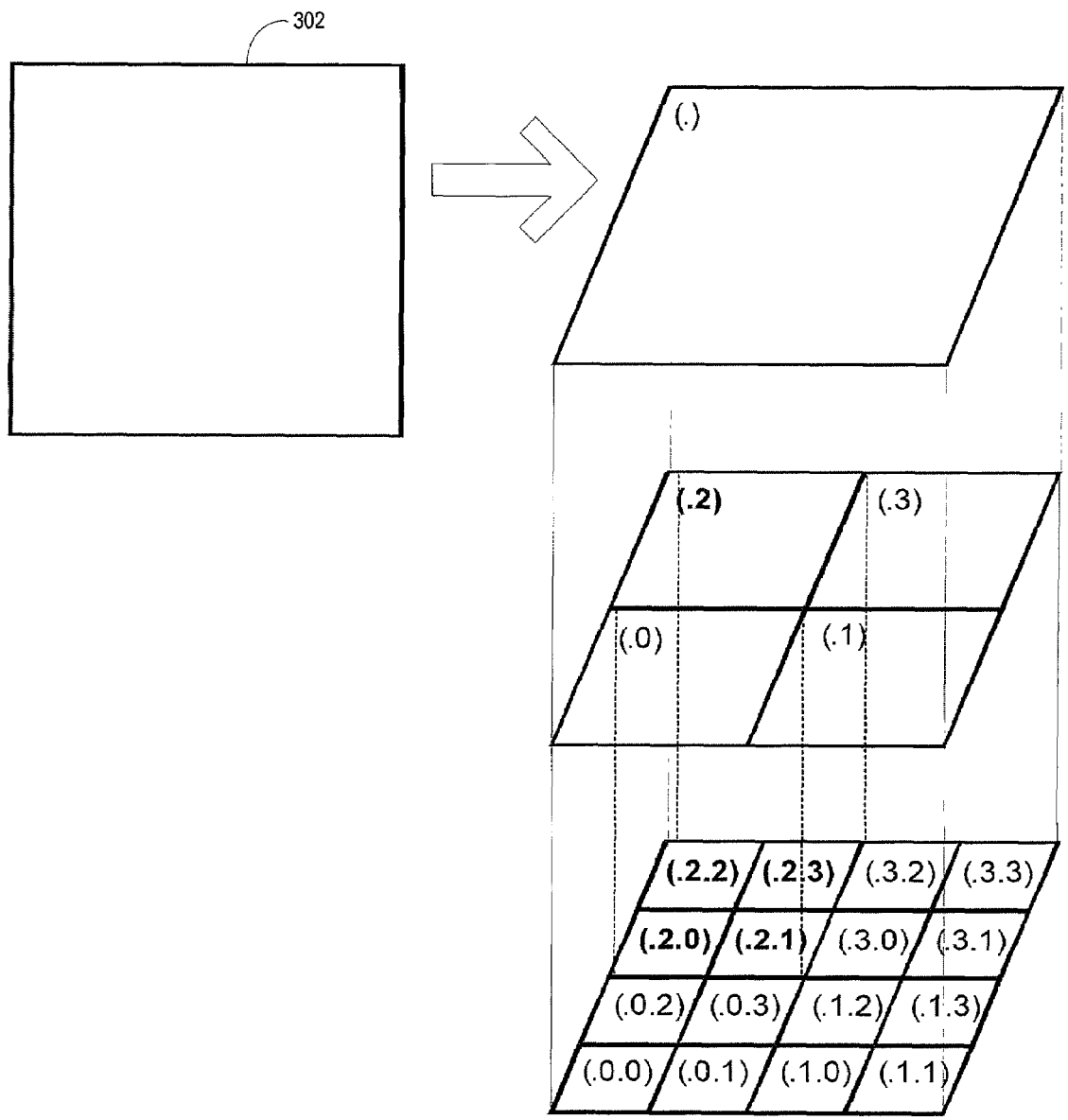
FIG. 3 depicts an exemplary embodiment of a CAD file divided into tiles according to the present invention, in a simplified two-dimensional representation.

FIG. 3 depicts an exemplary embodiment of a 2D CAD file 302 divided into tiles according to an embodiment of the present invention. In this simplified representation, tiles are arranged in a hierarchical quadtree structure. A quadtree is a tree data structure where each tree node contains four sections, each of which can point to a child node having four sections. The numbering system in this example labels each tile with one number from 0 to 3 for each level in the tile hierarchy. In FIG. 3, a main tile (.) contains four sub-tiles (.0), (.1), (.2) and (.3). Each sub-tile further contains four sub-tiles. For example, sub-tile (.2) contains sub-tiles (.2.0), (.2.1), (.2.2) and (.2.3). Again, the hierarchy can contain as many levels as necessary to hold all of the CAD elements. Furthermore, the depth of the tile hierarchy can vary from tile to tile. For example, tile (.2) could be divided into four sub-tiles as shown, while tile (.0) could be divided into two levels: (.0.0), (.0.1), (.0.2), (.0.3) and (.0.0), (.0.1), (.0.0.2), (.0.0.3). Tile (.3) might not have any sub-tiles and tile (.1) might not exist at all, if it contains no elements.

Figure 4:
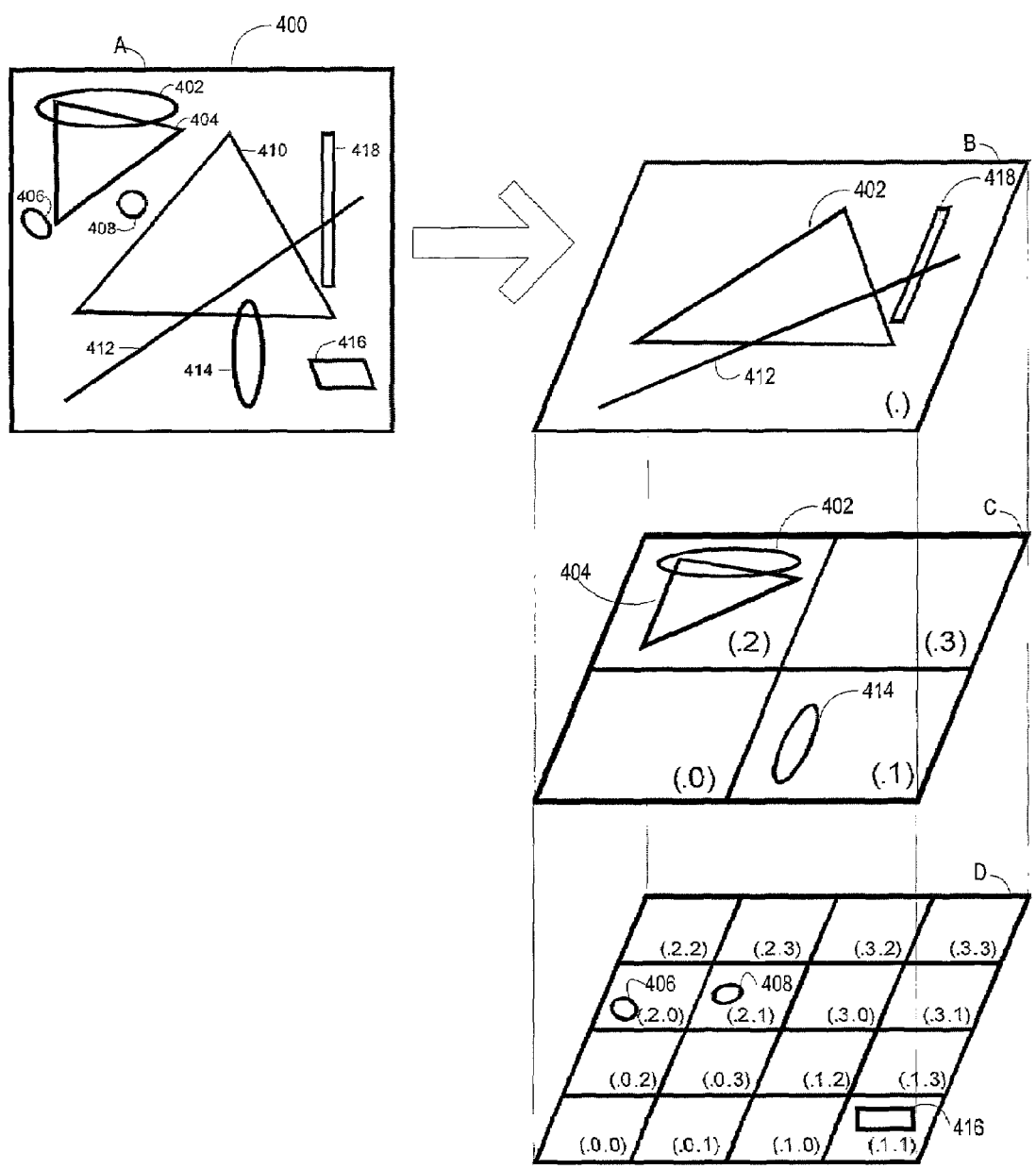
FIG. 4 depicts an exemplary embodiment of a tiled CAD file with graphics according to the present invention.

FIG. 4 depicts an exemplary embodiment of a tiled CAD file 400 with graphic CAD elements according to an embodiment of the present invention. The area of the highest level tile (.) can represent a view of the entire CAD file. The area of the highest level tile can also represent a view of the entire CAD file at a specific resolution, or level of detail. In such a tile, all of the elements within the tile, and its sub-tiles, are within a specific size range defined for the resolution.

The entire CAD file can be comprised of graphical CAD elements 402-418 in view A. Each CAD element is associated with the smallest tile into which it can fit completely. For example, in view D, element 408 is associated with tile (.2.1) and element 416 is associated with tile (.1.1). Elements larger than the smallest sub-tile, or that overlap more than one tile, are associated with the corresponding tile at the next highest level. For example, in view C, elements 402 and 404 are each associated with tile (.2). Elements 410, 412 and 418 are each associated with tile (.) in view B because the elements cannot fit completely in any smaller tile. The allocation of elements to tiles is analogous in 3D. Elements are allocated to the smallest tile whose volume completely encloses the element's volume.

The size and total number of tiles for a CAD file can be based on various factors. Here, two factors determine the allocation of tiles. First, a tile, including its sub-tiles, should contain some minimum number of elements, usually greater than two. This prevents the smallest tiles from being too small, and from making the octrees too large while containing sparse data. If a tile A, including its sub-tiles, does not contain the minimum number of elements, then all of the elements from tile A and its sub-tiles are stored in the parent tile of tile A. Tile A and its sub-tiles are then removed from the hierarchy. Second, once all tiles contain some minimum number of elements, the smallest tiles in the hierarchy should also be at least as small as a specified fraction of a commonly used view size. For example, a commonly used view size is 1000×1000 pixels, and the smallest sized tiles, i.e. those lowest in the hierarchy, should preferably be no larger than the view size. No tile in the lowest hierarchy level, i.e. the smallest area tiles, should be larger than the user's view area when viewing the file at the highest resolution, i.e. when all of the LODs are visible. If the smallest tiles were larger than the user's view at highest resolution, then the tile would contain data outside of the user's viewing area, defeating the purpose of only sending viewable data to the client.

Figure 5:
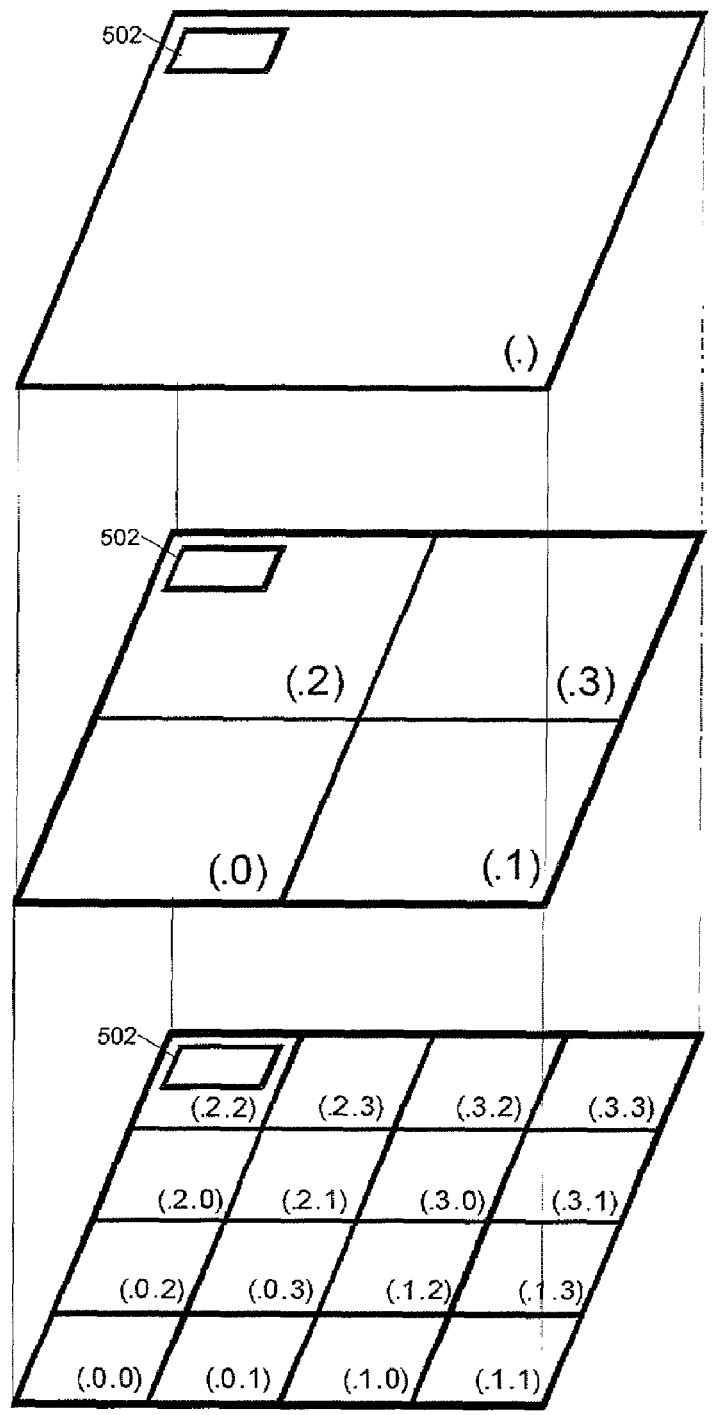
FIG. 5 depicts an exemplary embodiment of a tiled CAD file indicating which tiles will be sent to a client according to the present invention.

FIG. 5 depicts an exemplary embodiment of a tiled CAD file which illustrates how tiles can be sent to a client. When the user begins to view the file, he will select a portion of the CAD design to look at. The user will also select a resolution at which to view the design. In this example, the user has selected the area represented by rectangle 502. The client then determines the viewing area and checks a local cache to determine if the client already has the data needed to view the area 502. If the client does not have the data, or only has a portion of the data, the client will request the data for only area 502 from the server. If the client has a portion of the data, the client can tell the server which portion it already has. The server then uses the viewing area provided by the client and any partial data already stored by the client to send only the elements that could potentially intersect the viewing area to the client. In this example, the server would send tiles (.), (.2) and (.2.2) to the client, because all three tiles can contain elements that could intersect the viewing area. The client could then store the three tiles in a local cache.

Figure 6:
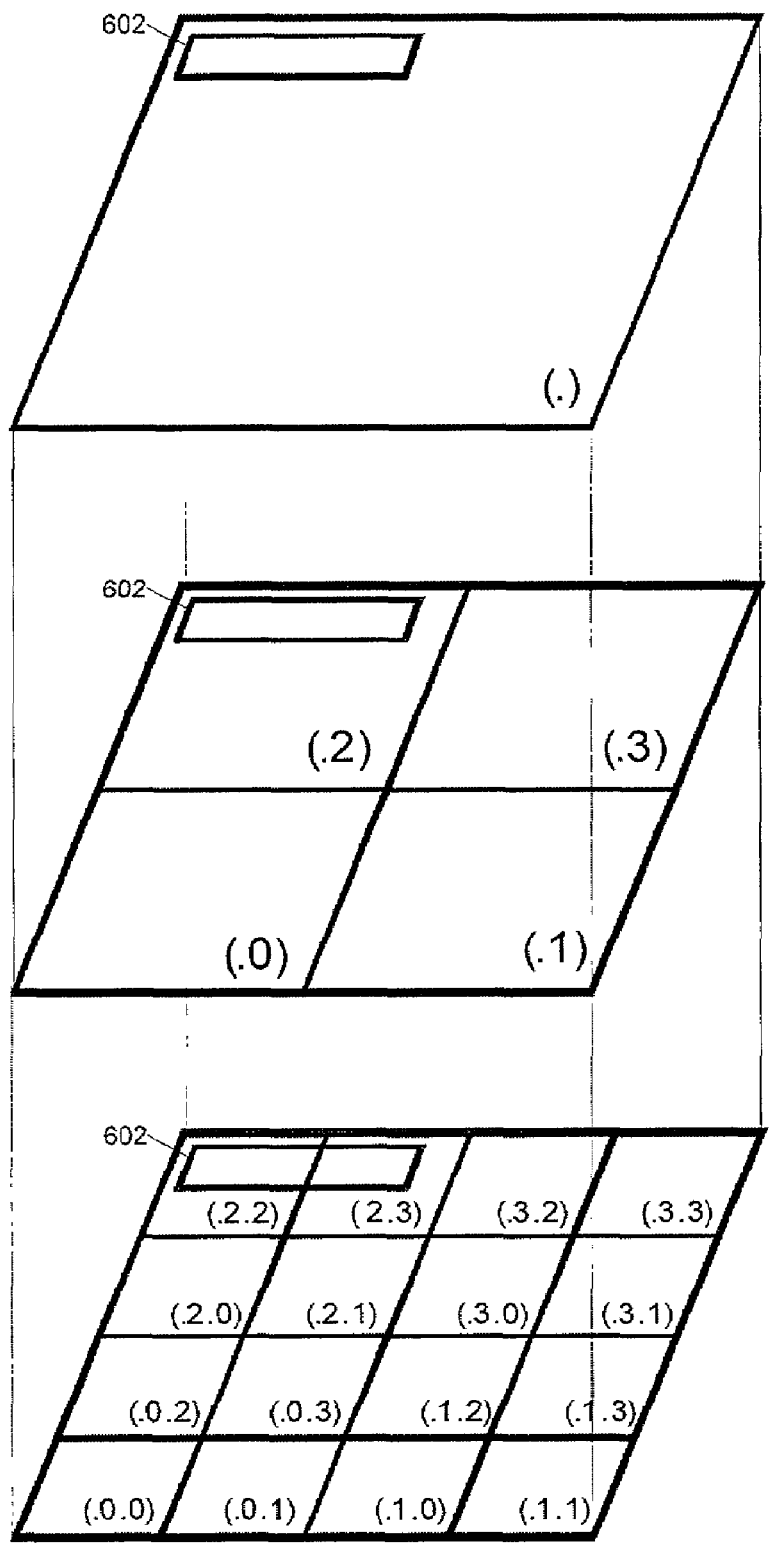
FIG. 6 depicts an exemplary embodiment of a tiled CAD file indicating which tiles will be sent to a client according to the present invention.

FIG. 6 depicts an exemplary embodiment of a tiled CAD file which illustrates how tiles can be sent to a client when the client's view changes. Continuing from the previous example, if the user then wished to view the area indicated by rectangle 602, the client would request the area, and tell the server that the client already had tile (.2.2). The server can infer that the client has the tiles higher in the hierarchy than (.2.2). By only sending the deepest tile to the server, the client minimizes the amount of information sent to the server. The server would only need to send the tile (.2.3) because the client already has the tile (.2.2) from the previous request, and the server can determine that the client also has tiles (0.2) and (.). Thus, the amount of information sent to the client is minimized.

Figure 7:
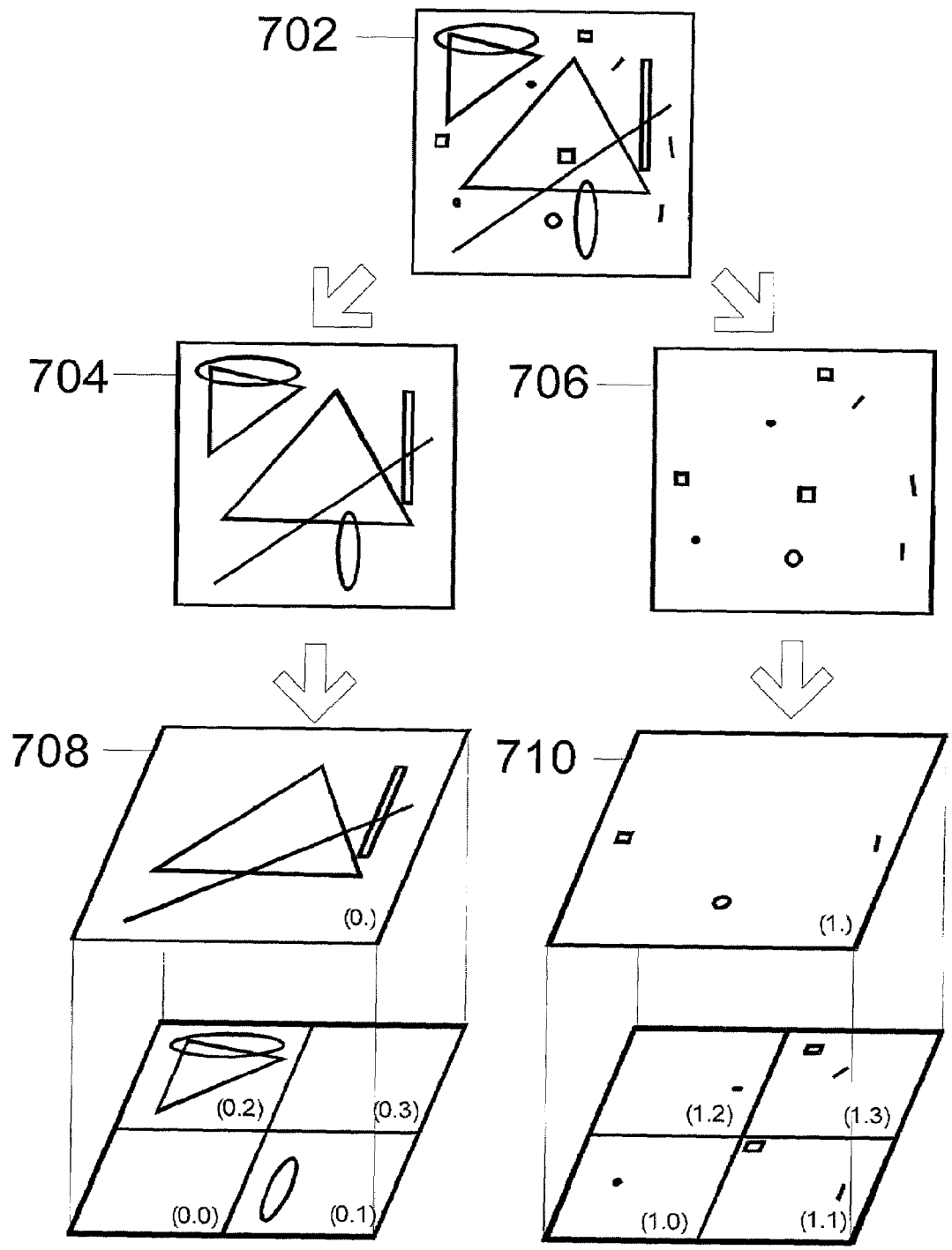
FIG. 7 depicts an exemplary embodiment of a tiled CAD file divided into tiles and overviews according to the present invention.

FIG. 7 depicts an exemplary embodiment of a tiled CAD file indicating how the elements are divided among LODs. Using tiles alone is not useful when the user is viewing the entire file at once, because, in such cases, all tiles would have to be sent to the client. The present invention, therefore, in addition to dividing the CAD file into tiles, divides the data into levels of detail (LOD). A LOD is a group of elements from the CAD file at a specific resolution. Views from far away require less detail than close-up views of smaller areas. Consequently, when the client views the data at a low resolution, the server sends the client only the tiles from the LODs that have elements that are visible at the client's resolution. The tiles of any LOD that contain elements that are too small to be seen by the client are not sent.

The LOD division precedes the tile division. Elements in a CAD file 702 are first divided according to their image size between groups 704 and 706, each group having elements of homogeneous size. A group of homogeneously sized elements is a LOD. Then each LOD 704 and 706 is divided into tiles 708 and 710, respectively, and stored in the octree structure described above (shown as quadtrees in FIG. 7). In this specific example, element groups 708 and 710 are the two LODs generated for file 702.

The number of LODs needed for a CAD file can depend on the size range of the elements in the file. In an exemplary embodiment, the smallest element sets the lower bound for the size range of the highest resolution LOD. Each element in a 3D file has three size measures, on in each of the three Cartesian directions x,y and z. Element size, in this context, is determined by the largest of those three size measures. For example, if an element were three units long in the x direction, two units long in the y direction and four units long in the z direction, its size would be four. However, other methods of determining the size range may also be used. The upper bound of the size range for the highest resolution LOD can be twice the size of the lower bound. Each subsequent LOD can contain elements that range from the upper bound of the previous LOD to elements twice that size. LODs are created in this manner until all of the elements are contained in a LOD. The number of levels of tiles within a LOD is determined, as described above, according to how many levels are needed before each element is contained in the smallest tile possible.

Figure 8:
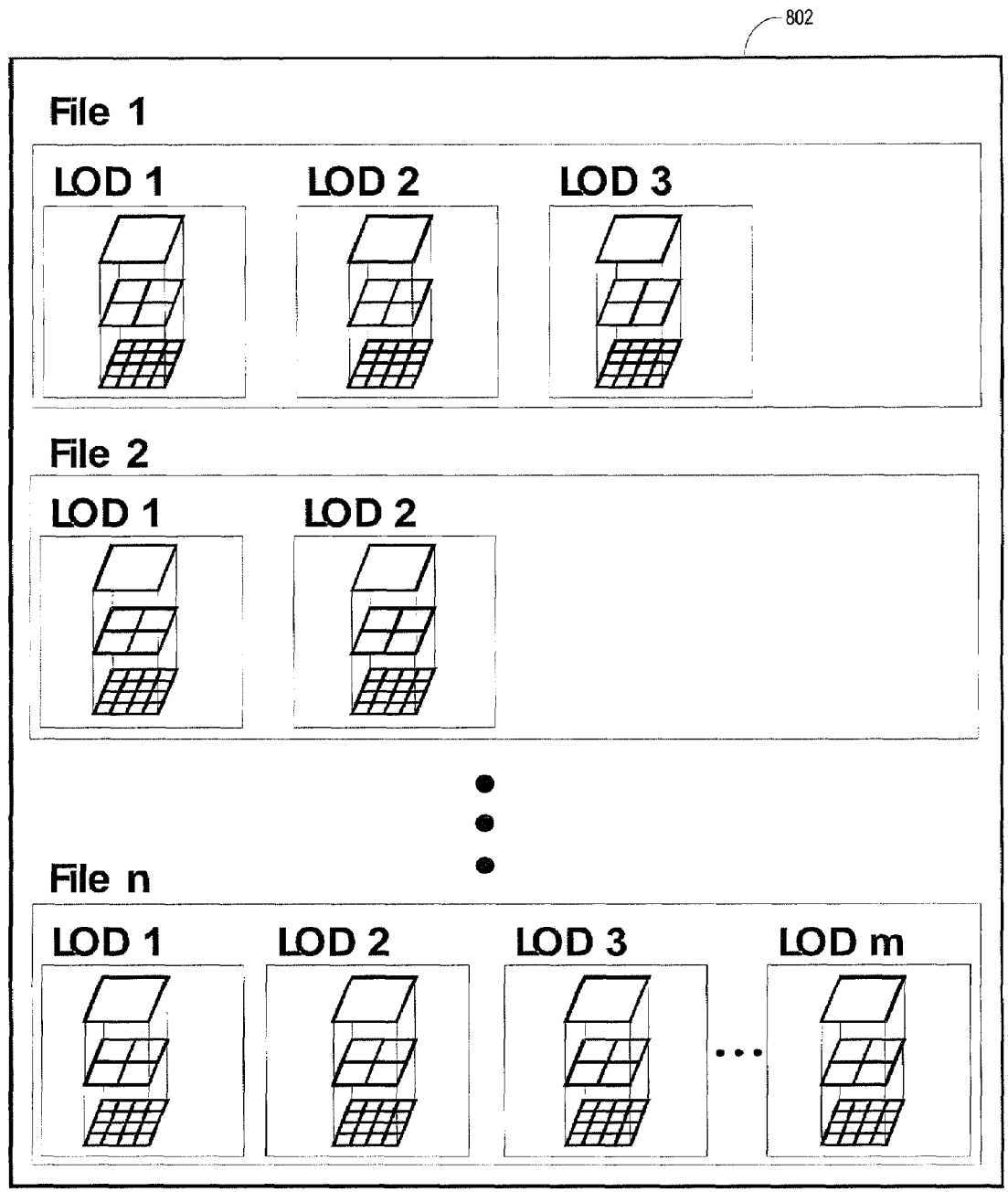
FIG. 8 depicts an exemplary embodiment of a cache that contains tiles and overviews for several CAD files, according to the present invention.

FIG. 8 depicts an exemplary embodiment of a cache 802 indicating how the cache is structured. The cache stores multiple octrees per CAD file (shown in FIG. 8 as quadtrees). Each octree represents the data at a specific resolution (LOD) and contains the elements of the file that fit into the resolution of the tree. The contents of each octree are therefore exclusive. Each CAD element is stored in only one octree of the cache for that file. The cache can contain several file entries, each entry containing octrees and tiles. A file entry in the cache represents the CAD file divided into tiles and LODs. The file entry contains the name of the CAD file, and its location, along with all the LODs and tiles related with that CAD file.

When the server receives a request from a client for a viewing region, the server determines which LODs contain elements that are actually visible to the user in terms of resolution. Visible elements are at least as large as some minimum number of pixels on the client's window for that resolution. Then, from these LODs, the server determines which tiles are actually visible in the client's view area. Consequently, only the visible tiles that contain elements sufficiently large to be seen by the user are sent to the client. If the user then zooms sufficiently into the view so that the next LOD elements become visible, then only the next LOD is needed by the client. All the data that the client has already received is not sent again.

For example, if the user is currently only viewing tiles from LOD 1 in File 1, this means that all the tiles from LOD 1 contain elements that are sufficiently large to be seen on the user's screen. The tile subdivision within a LOD is based on element position, rather than size. All elements could be the same size in LOD 1, and the elements could be distributed in tiles of various positions in the hierarchy simply because of their location. For example, some elements would cross tile edges, and therefore would remain in the top tile, while some others would not cross tile edges and would be stored lower in the hierarchy. Because all elements in a LOD are in a common size range, going down in the hierarchy of a LOD does not yield more details, but only elements that fit within a smaller tile. If the entire drawing were fitted to the screen, all of the tiles of all levels of LOD 1 would be seen.

If the user zooms in and reaches a point where elements from LOD 2 become sufficiently large to be visible on the user's screen, then tiles from LOD 2 are loaded. Because the client already contains the tiles from a lower resolution, only the tiles from LOD 2 that correspond to the view would be requested from the server.

Figure 9:
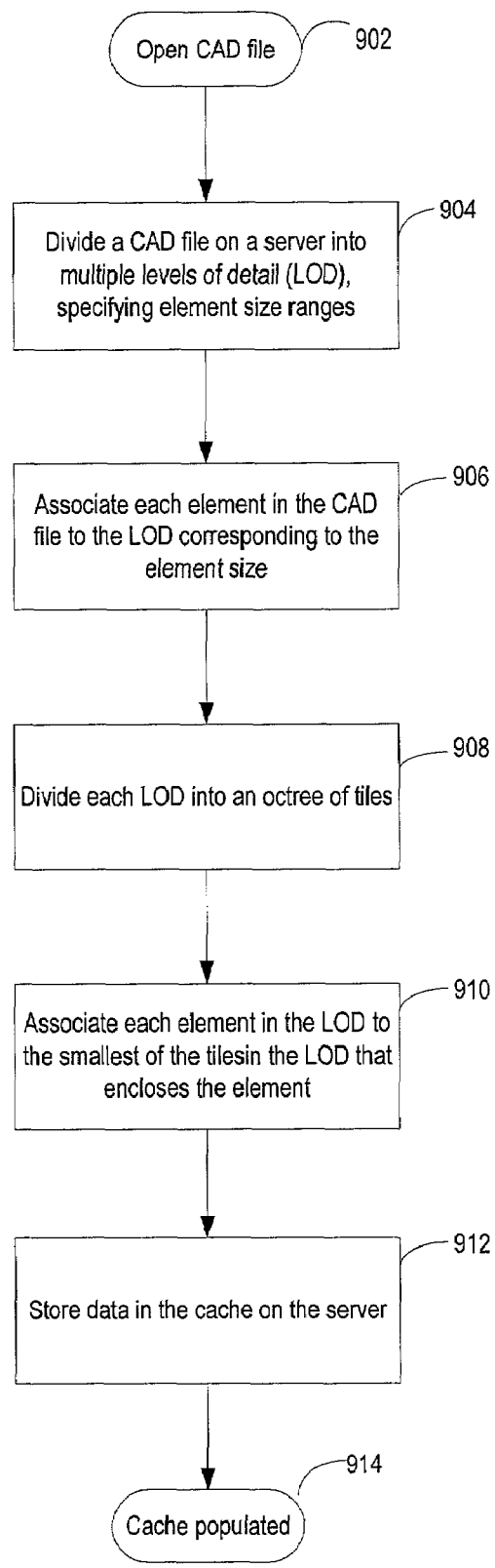
FIG. 9 depicts a flow chart of the method of populating a server cache according to the present invention.

FIG. 9 depicts a flow chart of the method of populating a server cache according to the present invention. Populating the server cache is necessary only when the contents of the CAD file have changed after the cache was populated, or when the cache did not previously contain any file entries for the CAD file. Once populated, the cache can be stored indefinitely as long as the CAD file contents do not change.

When a user opens a CAD file to view the design or to continue work in step 902, if the cache is not already populated, the server divides the CAD file into multiple LODs in step 904. Each element in the CAD file is then associated by size with the corresponding LOD in step 906. Then, each LOD is further divided into an octree of tiles in step 908. For each LOD, each element of that LOD is then associated with the smallest tile into that encloses the element, in step 910. The CAD file is then stored in the cache, in step 912, in the form of tiles and LODs. The cache is then fully populated at step 914 and is ready to be served to the client.

Figure 10A:
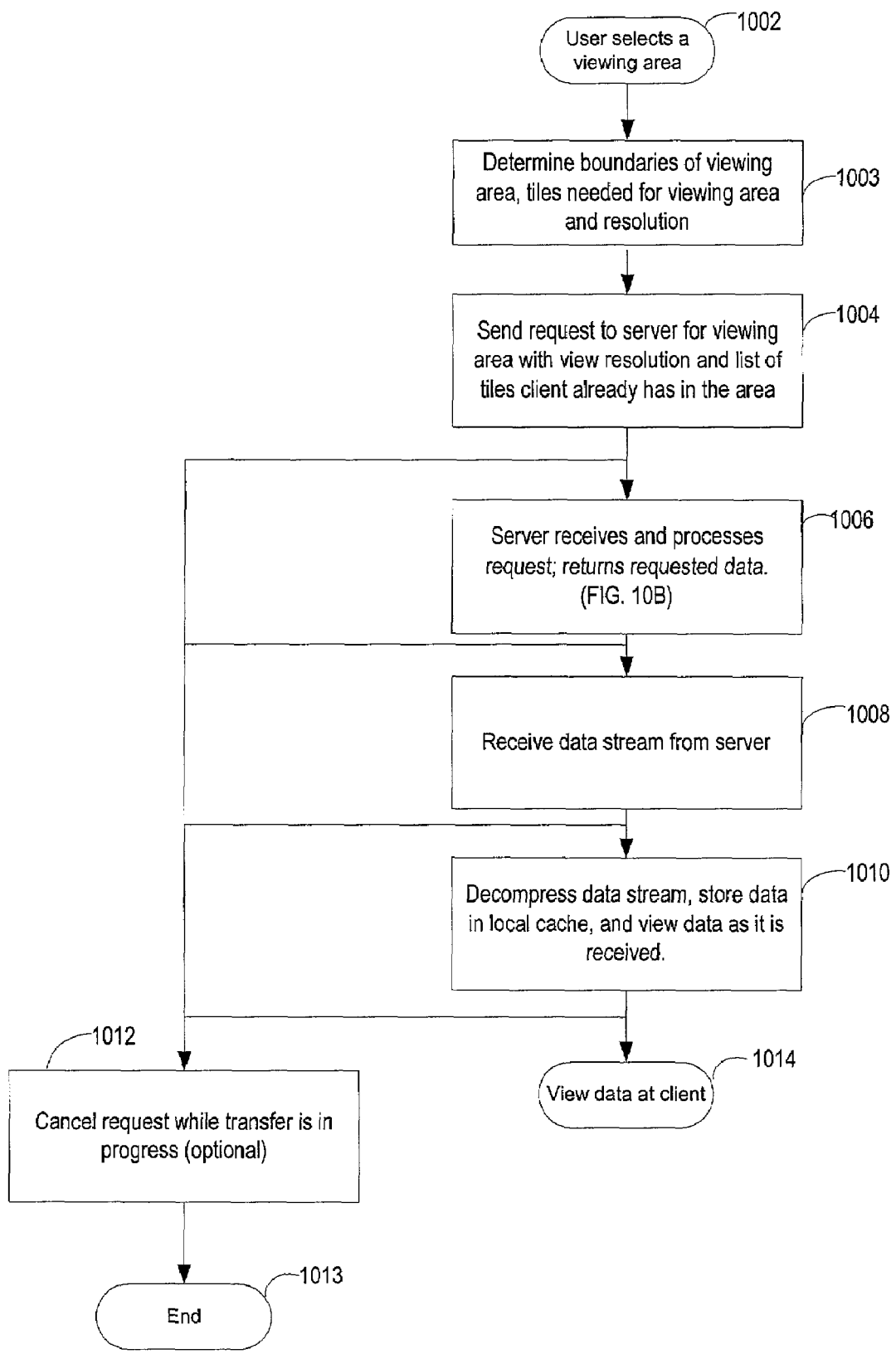
FIG. 10A depicts a flow chart of the method of a client requesting and receiving data according with the present invention.

FIG. 10A depicts a flow chart of the method of a client requesting and receiving data according to an embodiment of the present invention. When a user chooses to look at the design in a CAD file, or when the user changes what he is looking at in the CAD file, in step 1002, the client sends a request to the server for the data contained in the user's current view in step 1004. The request can contain a description of the user's viewing area, such as the borders of the viewing area and the resolution. If the user has already viewed part of the CAD file, the client may already have some of the data, in the form of the LOD/tile hierarchy, needed to display the viewing area stored in the local client cache. If so, the request for data can also include a list of the tiles at the deepest level (i.e. the smallest tile size) of the hierarchy stored in the client's cache that lie in the viewing area. The client also knows when a LOD octree is complete. If the client already has the deepest tiles in a LOD octree, it will not request any portion of that octree. Including a list of tiles that the client already has to the server prevents the need to have the server maintain a list for each client of which tiles each client has already received.

The server receives and processes the request in step 1006 (described below with respect to FIG. 10B), and returns the relevant requested data. The client receives the data from the server in step 1008. If the data is streamed and compressed, the client decompresses and displays the data as it is received, and stores the decompressed data in the client's local cache in step 1010. When all of the data are received, the user can view all of the data in step 1014.

At any point after the original request for data and before all of the data are received, the client can cancel the request and receiving process, if required from the user, in step 1012. Because the user can begin to view the data before all of it is received, if the user changes his mind about what he wishes to see while the data are transferred, canceling the request for data in midstream saves the user the time otherwise lost waiting for the data transfer to finish before being able to request another view. Cancellation ends the serving of the data at step 1013, and the client can show only what has been received so far.

In the special case where the client has never opened a particular CAD file (not illustrated), the client does not know what tiles to request when opening the file for the first time. In that instance, the client will send a generic request for data from the server. The server will then send a list of the LODs and the size of the file back to the client. The client can then proceed in the manner illustrated in FIG. 10A in requesting specific areas of the CAD file to view.

Figure 10B:
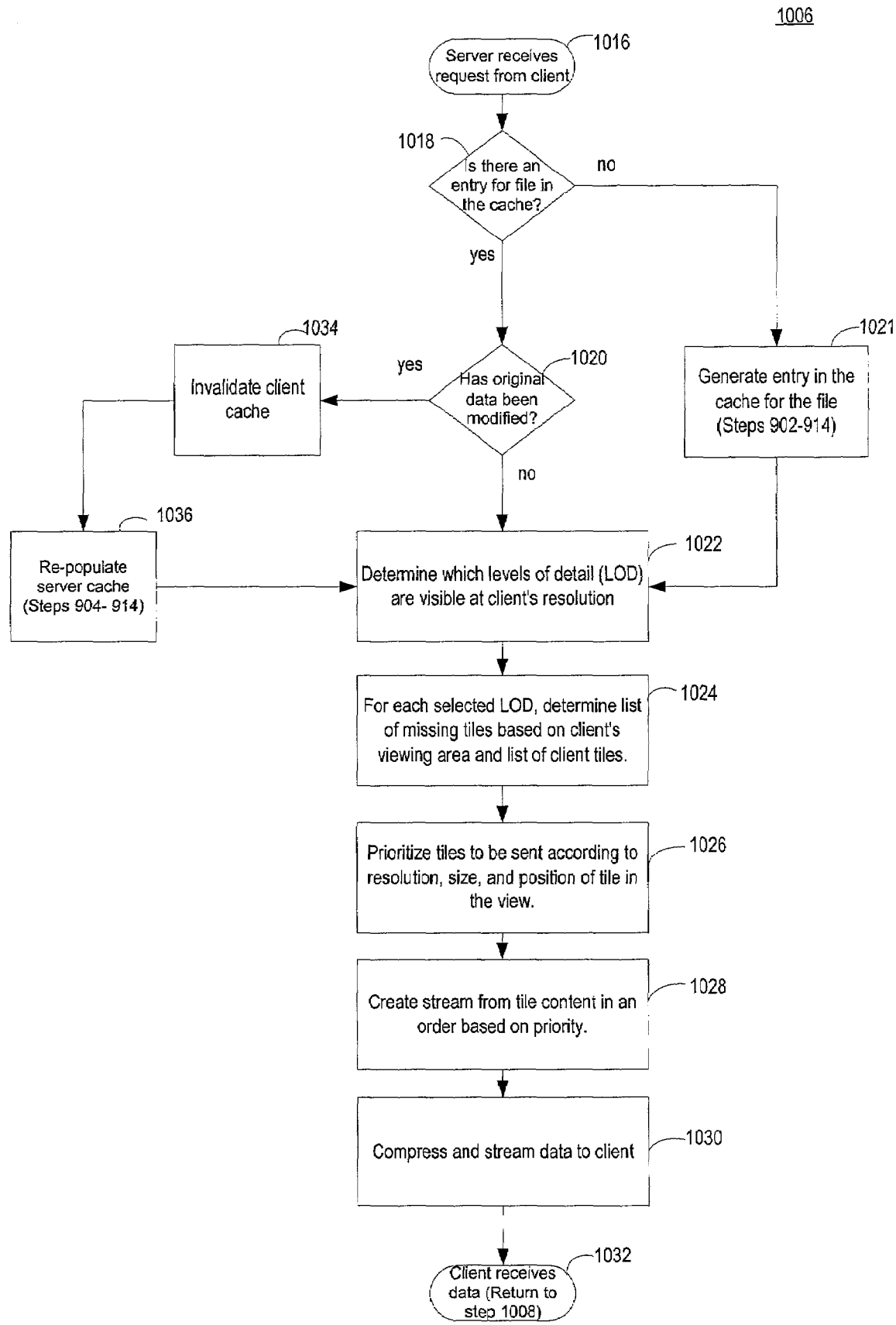
FIG. 10B depicts a flow chart of the method of sharing data with a client from the server according to the present invention.

FIG. 10B depicts a flow chart of the method 1006 of sharing data with a client from the server according to the present invention. The server receives the client's request for data in step 1016 and first determines if there is an entry for that file already in the cache in decision step 1018. If not, the server will first generate an entry by populating the cache, as shown in FIG. 9, in step 1021. If the cache contains an entry for the CAD file, the server then checks if the elements in the CAD file have been modified, in decision step 1020. If yes, the cache on both the server and the client becomes invalid. The client is notified that its version of the cache is no longer valid, in step 1034, so that new requests for data can be constructed by the client. The server then re-populates the cache, in step 1036, in the manner of FIG. 9, starting at step 904.

If the original data has not changed, or once the cache has been re-populated, the server determines which LODs are visible at the client's resolution in step 1022. Then, for each visible LOD, the server determines the list of tiles that the client should receive, based on what tiles the client already has in the area and which tiles are required to display the viewing area, in step 1024. Because the client has given the server a list of the smallest, i.e. deepest level, tiles the client already has in an octree, the server can check its own cache to determine if there are deeper level tiles that the client needs. The practice of sending the list of the deepest tiles from the client to the server relieves the client of having to know all of the tiles that are available for a CAD file, and of having to know which specific tiles to request.

The server then generates a list of tiles needed by the client, and prioritizes the tiles based on factors such as tile resolution, tile size, and position in the view, in step 1026. Highest priority is given to the largest tiles, those that contain larger elements, and tiles that are in the middle of the view. The highest priority tiles will be sent to the client first so that the user can start viewing the largest elements and those that are in the center of the view first. This improves the apparent speed of the data download, as the user can view meaningful parts of the data more quickly. Then, the server creates a data stream based on the content of the prioritized tiles in step 1028. The stream is compressed and sent to the client in step 1030. The client then receives data in step 1032, returning to step 1008 in FIG. 10A.

While various embodiments of the present invention have been described above, it should be understood that the embodiments have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method in a computer system for publishing CAD data over a network comprising the steps of:
   dividing CAD data from a CAD data file on a server into a plurality of levels of detail (LODs);
   associating a CAD element in said CAD data to only one LOD that corresponds to said element's size;
   dividing said LODs into a plurality of tiles;
   associating a CAD element in said only one LOD to the smallest one of said plurality of tiles that encloses said element;
   storing said plurality of tiles and said plurality of LODs in a server cache, said server cache being coupled to said server; and
   publishing at least one tile to a client.

2. The method of claim 1, further comprising the steps of:
   receiving a request for data in a viewing area from a client;
   populating said server cache when said server does not contain said requested data;
   determining whether the data in said server cache is valid;
   when the data in said server cache is valid, selecting a first set of tiles from said data in said server cache, wherein said first set of tiles is viewable at said client's resolution;
   selecting a second set of tiles from said first set of tiles, wherein said second set of tiles is enclosed by said viewing area;
   selecting a third set of tiles from said second set of tiles, wherein said third set of tiles are not already stored by said client in a local cache;
   prioritizing said third set of tiles; and
   publishing said third set of tiles to said client.

3. The method of claim 2, wherein said request comprises at least one of a viewing area boundary, a client resolution, and a list of tiles stored by said client.

4. The method of claim 2, further comprising:
   when the data in said server cache is not valid, invalidating a cache on said client; and
   repopulating said server cache with valid data.

5. The method of claim 2, wherein said publishing step comprises:
   compressing said prioritized third set of tiles; and
   streaming said compressed third set of tiles to said client.

6. The method of claim 2, wherein said prioritizing is based on at least one of the position of said third set of tiles in the viewing area, the size of said tiles, and the resolution of said tiles.

7. The method of claim 1, wherein said CAD data file is a vector file.

8. The method of claim 1, wherein said CAD data is three dimensional (3D).

9. A method in a computer system for publishing CAD data over a network comprising the steps of:
   receiving, on a client, a user request for a view of a part of a CAD data file;
   transmitting a data request to a server, wherein said request comprises at least one of a client view resolution, a list of tiles not required for said part of said CAD file, and a boundary of said requested view; and
   receiving said requested data from said server, wherein said received data comprises at least one tile in one level of detail (LOD), wherein said at least one tile has associated with it a CAD element, wherein said CAD element is associated with only said one LOD, and said at least one tile is the smallest one of said plurality of tiles that encloses said CAD element.

10. The method of claim 9, wherein said list of tiles not required is created by:
    determining which tiles comprising said requested view are stored in a local cache on said client;
    identifying a set of tiles at a deepest hierarchy level in said local cache; and
    listing said set of tiles at a deepest hierarchy level in said list of tiles not required.

11. The method of claim 9, further comprising, when said client has never opened said CAD file:
    prior to said step of sending a data request to said server, sending a generic request for data to said server, and
    receiving from said server a list of levels of detail representing said CAD file, and a size of said CAD file, thereby allowing said client to construct said data request.

12. The method of claim 9, wherein said step of receiving said requested data further comprises:
    receiving said requested data as compressed and streamed data; and
    decompressing, interpreting and displaying said compressed and streamed data while said compressed and streamed data are being received from said server.

13. The method of claim 9, further comprising storing said received requested data on said client in a local cache.

14. The method of claim 9, wherein said CAD data file is a vector file.

15. The method of claim 9, wherein said CAD data is 3D.

16. A system for publishing CAD data over a network comprising:
    a server;
    a client coupled to said server via a network;
    a server cache coupled to and accessible by said server, operative to store at least one level of detail (LOD) and at least one tile within said LOD;
    a client cache coupled to and accessible by said client, operative to store at least one LOD and at least one tile within said LOD;
    a file divider on said server, operative to divide a CAD data file into a plurality of LODs;
    a LOD associator on said server, operative to associate a CAD element in said CAD data file with only one LOD;
    a LOD divider on said server, operative to divide a LOD into a plurality of tiles; and
    a tile associator on said server, operative to associate each CAD element in said LOD with only one tile, wherein said only one tile is the smallest one of said plurality of tiles that encloses said CAD element.

17. The system of claim 16, further comprising:
    a client request receiver, operative to receive a request for data from said client;
    a cache validator, operative to determine if the data in said server cache is valid;
    a data selector, operative to select data from said server cache, wherein said selected data comprises only said requested data not already stored on said client; and
    a prioritizer, operative to prioritize said selected data.

18. The system of claim 17, further comprising a data compressor, operative to compress and stream said selected data.

19. The system of claim 16, further comprising:
a user request receiver on said client, operative to receive a user request on said client to view a part of a CAD data file;
a needed data identifier on said client, operative to identify only the data needed by the client to display said requested view;
a server data requestor on said client, operative to request said needed data from a server; and
a server data receiver on said client, operative to receive said requested data from said server, wherein said requested data comprises at least one tile and one level of detail.

20. The system of claim 17, wherein said needed data comprise tiles in a LOD corresponding to said client's resolution, and wherein said tiles comprise said requested view and are not stored in said client cache.

21. The system of claim 17, wherein said received requested data is compressed and streamed data; and wherein said server data receiver further comprises a data decompressor, operative to decompress, interpret and display said compressed and streamed data while the data are being received from said server.

22. The system of claim 16, wherein said server cache and said client cache each comprise a plurality of octrees and wherein each octree stores one LOD and a plurality of tiles.

23. The system of claim 16, wherein said CAD data file is a vector file.

24. The system of claim 16, wherein said CAD data is 3D.

25. A computer program product embodied on a computer readable medium comprising program logic, wherein the program logic is adapted to be executed on a computer and comprises:
CAD data publishing code means for enabling a processor to publish CAD data over a network said code means comprising:
CAD data file division means for dividing a CAD data file into a plurality of levels of detail (LOD);
LOD association means for associating each CAD element in said CAD data file with only one LOD;
tile division means for dividing each LOD into a plurality of tiles;
tile association means for associating each element in said LOD with only one tile, wherein said only one tile is the smallest one of said plurality of tiles that encloses said CAD element; and
CAD data storage means for storing CAD data as LODs and tiles.

26. The computer program product of claim 25, wherein said code means further comprises:
data request reception means for receiving a request for CAD data in a viewing area from a client;
validity determination means for determining whether the data in said CAD data storage means is valid;
tile resolution selection means for selecting a first set of tiles from said data file, wherein said first set of tiles is viewable at said client's resolution;
tile location selection means for selecting a second set of tiles from said first set of tiles, wherein said second set of tiles is enclosed by said viewing area;
tile prioritization means for prioritizing said second set of tiles; and
tile publication means for publishing data comprising said second set of tiles from said server to said client.

27. The computer program product of claim 26, further comprising:
client cache invalidation means for invalidating a cache on said client when said validity determination means determines that the data in said CAD data storage means is not valid; and
CAD data storage re-population means for repopulating said CAD data storage means with valid data.

28. The computer program product of claim 26, further comprising:
compressing said published data; and
streaming said published data.

29. The computer program product of claim 26, wherein said tile prioritization means bases priority on at least one of the position of said second set of tiles in the viewing area, the size of said tiles, and the resolution of said tiles.

30. The computer program product of claim 26, wherein said CAD data file is a vector file.

31. The computer program product of claim 26, wherein said CAD data is three dimensional (3D).

32. A computer program product embodied on a computer readable medium comprising program logic, wherein the program logic is adapted to be executed on a computer and comprises:
CAD data publishing code means for enabling a processor to publish CAD data over a network said code means comprising:
user request reception means for receiving on a client a user request to view a part of a CAD data file;
needed data identification means for identifying a sub-part of said requested part, wherein said sub-part is not stored in a local cache on said client;
server request means for requesting said sub-part from a server; and
server data reception means for receiving said sub-part from said server, wherein said sub-part comprises at least one tile and one level of detail (LOD), wherein said at least one tile has associated with it a sub-part, wherein said sub-part is associated with only said one LOD, and said at least one tile is the smallest one of said plurality of tiles that encloses said sub-part.

33. The computer program product of claim 32, wherein said received sub-part is compressed and streamed data; and wherein said server data reception means further comprises display means for decompressing, interpreting and displaying said compressed and streamed data before all of the data has been received from said server.

34. The computer program product of claim 32, further comprising client storage means for storing said received subpart on said client.

35. The computer program product of claim 32, wherein said CAD data file is a vector file.

36. The computer program product of claim 32, wherein said CAD data is 3D.

* * * * *